United States Patent [19]

Cosgrove

[11] Patent Number: 4,672,431
[45] Date of Patent: Jun. 9, 1987

[54] CONTOUR CORRECTION SYSTEM WHEN ONE COLOR SIGNAL IS LOW

[75] Inventor: William J. Cosgrove, Quincy, Ill.

[73] Assignee: Harris Corporation, Melbourne, Fla.

[21] Appl. No.: 904,796

[22] Filed: Sep. 5, 1986

Related U.S. Application Data

[63] Continuation of Ser. No. 545,537, Oct. 26, 1983, abandoned.

[51] Int. Cl.⁴ .................. H04N 9/093; H04N 9/64
[52] U.S. Cl. ................................................. 358/37
[58] Field of Search ......................... 358/37, 50, 51

[56] References Cited

U.S. PATENT DOCUMENTS

| Re. 29,570 | 3/1978 | Breimer et al. | 358/37 |
| 3,546,372 | 12/1970 | Dischert | 358/37 |
| 3,681,520 | 8/1972 | Schneider | 358/37 |
| 4,209,801 | 6/1980 | Dischert et al. | 358/37 |

Primary Examiner—John W. Shepperd
Attorney, Agent, or Firm—Tarolli, Sundheim & Covell

[57] ABSTRACT

The contour correction system herein for a TV camera system generates contour correction signals from the green and red video signals. The red contour signal is selectively added to the green contour signal in such a manner as to not accentuate errors in misregistration of the video signals.

8 Claims, 8 Drawing Figures

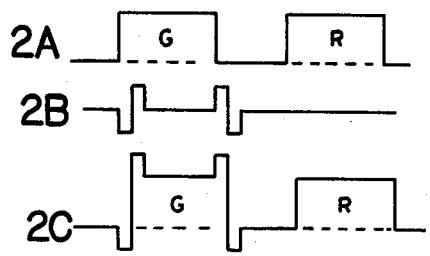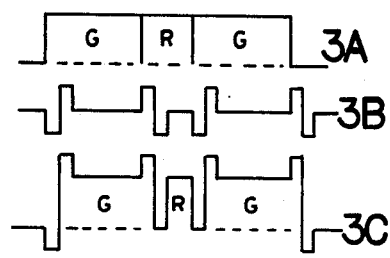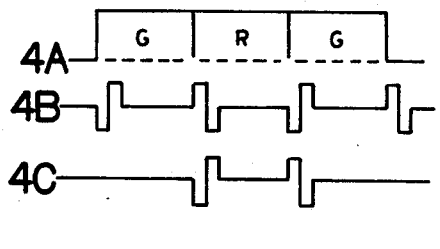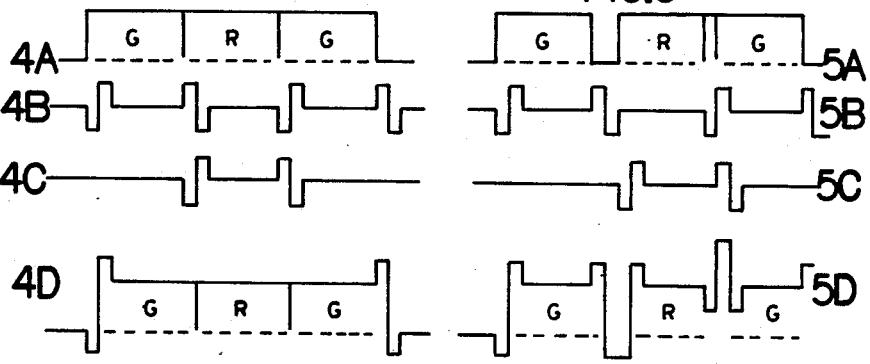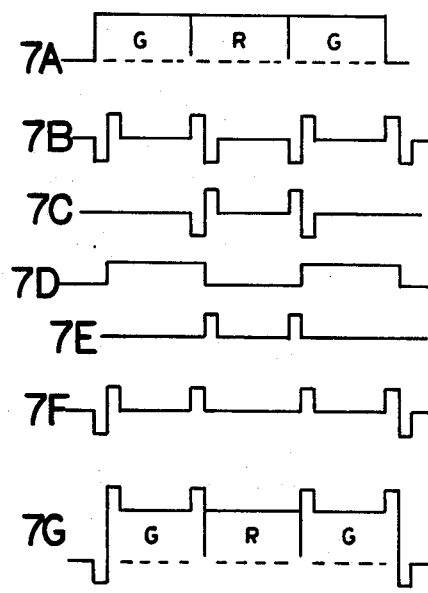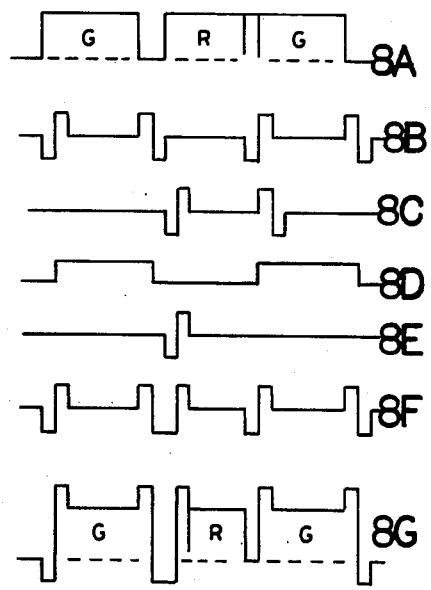

CONTOUR CORRECTION SYSTEM WHEN ONE COLOR SIGNAL IS LOW

This application is a continuation of application Ser. No. 545,537, filed Oct. 26, 1983 now abandoned.

BACKGROUND AND SUMMARY OF THE INVENTION

This invention relates to the art of color television camera systems and, more particularly, to improvements relating to contour enhancements for purposes of improving picture sharpness.

It is known in the art that picture sharpness may be increased by some form of aperture correction or contour correction. Such correction tends to correct for apparent loss of resolution due to the imperfections in the production and transmission of picture signals. It is known in the art for cameras using red, green and blue camera pickup devices to extract high frequency horizontal and vertical spatial information from one of the three color signals and then add this information back to each of the three color signals or the luminance signal. Generally, it is the green signal that is employed in deriving an aperture or contour correction signal since the majority of enhancement required for most average scenes is best obtained from contours out of the green video signal. This green derived contour correction signal is then added to each of the three color signals individually or to the luminance signal. In this way the thus aperture corrected color signal provides sharp transistions.

Aperture corrected color signals derived only from the green video signal exhibit problems in that scenes which contain little or no green information appear soft or lacking in sharpness. Thus, for example, large area red scenes are noticeably soft since there is no contour information from the red video signal. In such a system, then, where the red and green video signals are separated from each other, the combination of enhanced green derived contour signal and nonenhanced red provide an appearance of unbalance and will sometimes cause a viewer to conclude that the picture is coming from a camera that seems to be out of focus. Additionally, where the red and green video signals are adjacent to each other, the green enhanced contour signals may extend into the red video signal area and reduce the luminance on the edge of the red signal. If the red image is small, this low luminance becomes a greater portion of the total image size and causes the red image to appear dark.

The enhancement unbalance between separate red and green images could be cured by deriving a contour signal from the red video and summing this signal with the green contour signal. However, this may cause other problems when the two images are adjacent to each other since the transitions of the red and green contour signals may cancel at the adjacent point causing a loss or unbalance of enhancement at the color edges. Additionally, where there is some misregistration or overlap of the images, this solution may accentuate the misregistration error rather than be subdued as is the case when the contour signal is derived from only a single color video such as the green video signal.

The problem of using contour signal derived from only one of the three video color signals as well as the tendency to accentuate misregistration error has been addressed in the prior art. U.S. Pat. No. 4,209,801, to R. A. Dischert et al., presents a system wherein the aperture correction signal is normally derived from the green video signal but also from the red video signal when the red video signal attains a magnitude of essentially twice the amplitude level of the green video signal. The U.S. Pat. No. 3,681,520, to H. Schneider, presents a system wherein the aperture correction signal is derived by examining the amplitude of the green, blue and red video signals and using the signal having the greatest amplitude to derive the contour correction or aperture correction signal. A still further example of relevant prior art is the U.S. Pat. No. Re. 29,570, to Breimer et al., and which presents a system for preventing over compensation for aperture correction particularly during superposition error. The contour correction signal is derived from only one of the color signals which is then added to each of the red, green and blue color signals separately or by way of a matrix network.

From the noted prior art patents, it is seen that it is known to sharpen a picture generated by a color camera by adding an aperture correction or contour signal to the video signal to accentuate the edges thereof. However, if the contour signal is generated always from only one of the three colors, such as the green color video, then scenes which are largely of another color, such as red, result in a softness at the edges since there is no contour information from the red video signal. However, if the contour signal is derived from more than one color, such as both green and red video signals, then, other problems may occur, such as total cancellation of the contour signals when images are adjacent to each other, or accentuating registration errors of a slightly misregistered picture.

The present invention is directed to providing improvements in picture sharpness by providing contour signals in such a manner as to minimize accentuation of color registration errors. In accordance with one aspect of the present invention, this is achieved by providing contour signals derived from the green video signal and the red video signal. The two contour signals are selectively added together only at such times as the addition of the two signals would not result in accentuation of color registration errors.

Thus, it is a primary object of the present invention to provide aperture correction signals or contour signals to be applied to the video signal to accentuate the edges of the video signals in such a way that accentuation of color registration errors is minimized.

It is a still further object of the present invention to provide a contour signal derived from the red video which is then selectively added to a green video derived contour signal only when such addition would not result in accentuating color registration errors.

In accordance with the invention, a contour correction system is provided for a TV camera system which provides at least first and second video color signals, such as green and red video signals. First and second contour signals are respectively derived from the first and second video signals. Normally, the first contour signal is added to all of the video signals to improve picture sharpness. The second contour signal is selectively added to the first contour signal to provide a composite contour signal for addition to the video signals only during such times as the composite contour signal does not accentuate color misregistration.

BRIEF DESCRIPTION OF THE DRAWINGS

The foregoing and other objects of the invention will become more readily apparent from the following description of the preferred embodiment as taken in conjunction with the accompanying drawings which are a part hereof and wherein:

FIGS. 2A-2C are waveforms illustrating one mode of operation of the prior art system shown in FIG. 1;

FIGS. 3A-3C are waveforms illustrating another mode of operation of the prior art system shown in FIG. 1;

FIGS. 4A-4D are illustrative waveforms useful in describing problems to which the present invention is directed;

FIGS. 5A-5B are similar to that of FIGS. 4A-4D and are useful in describing problems to which the present invention is directed;

FIGS. 7A-7G are waveforms illustrative of one mode of operation of the present invention; and FIGS. 8A-8G are waveforms illustrative of another mode of operation of the present invention.

DESCRIPTION OF THE INVENTION

Figure 1:
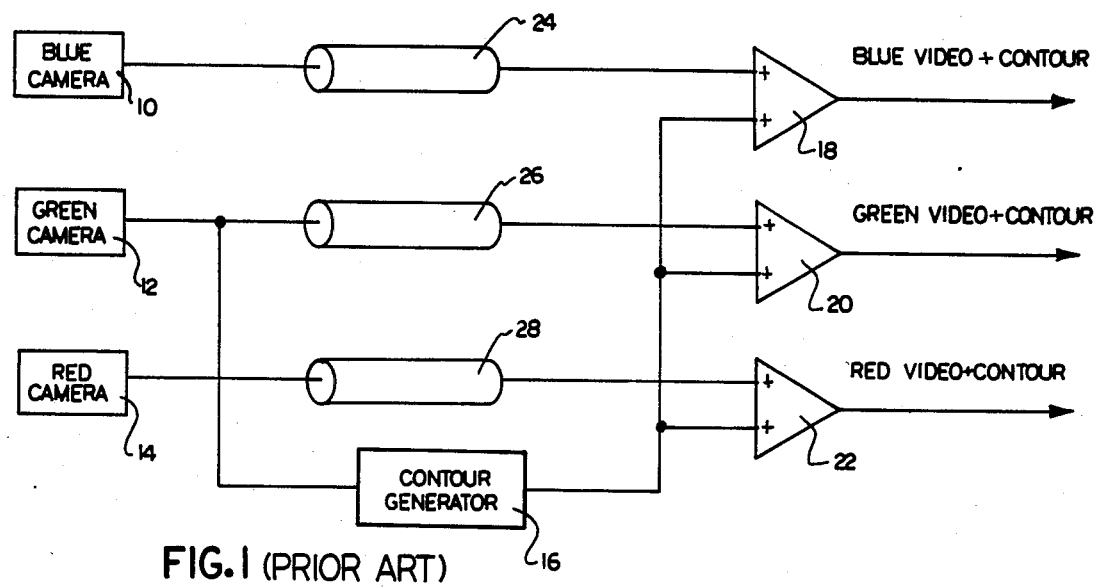
FIG. 1 is a schematic-block diagram illustration of a prior art method of enhancing picture sharpness.

Reference is now made to FIG. 1 which illustrates a prior art contour correction system for a television system employing a blue camera tube 10, a green camera tube 12 and a red camera tube 14. As is conventional, the green video signal is supplied to a contour generator 16 which extracts the high frequency video information therefrom and supplies the resulting contour signal to summing circuits 18, 20 and 22. These summing circuits serve to respectively sum the contour signal with the blue video, the green video and the red video signals for purposes of contour enhancement which has the effect of increasing picture sharpness. The blue, green and red video signals are applied to the summing circuits by way of delay lines 24, 26 and 28, respectively. The delay in each of these delay lines approximates the delay in the contour generator 16. The blue, green and red video signals may, alternatively, be summed together first to obtain a luminance signal to which the contour correction signal is added.

Prior art systems, such as that shown in FIG. 1, typically derive a contour or aperture correction signal from the green video signal. This is because it has been found in practice that the contour or correction signal should be derived from the color signal forming the greatest component of the brightness of the signal. Typically, in television camera systems, the brightness signal is composed of 0.30 R plus 0.11 B plus 0.59 G, where R, G and B designate the red, green and blue color signals, respectively. Consequently, it is the green color signal that is typically chosen for use in deriving the contour correction signal. However, if scenes contain little or no green information, then they will appear soft or lacking in sharpness. For example, large area red scenes are noticeably soft, as there is no contour information obtained from the red video signal.

FIGS. 2 and 3 illustrate two situations that are disturbing when contour signals are derived only from the green video signal As shown in FIG. 2A, the green (G) and red (R) video signals are separated from each other. The waveform of FIG. 2B illustrates a contour signal derived only from the green video, and FIG. 2C illustrates the resulting delayed luminance waveform when the green contour signal is added to it. From this waveform, it is seen that the combination of the contour enhanced green video and the nonenhanced red video appear unbalanced and this will sometimes cause a viewer to be aware that the picture is coming from a camera that does not appear to be properly focused.

The waveforms of FIGS. 3A-3C illustrate another condition that occurs when the red and green video signals are adjacent to each other. The contour correction signal derived from the green video signal only is shown in FIG. 3B. When the green contour correction signal is added to the delayed luminance signal as is shown in the waveform of FIG. 3C, it is seen that the negative going transitions of the green contour signal extend into the red video area and reduce the luminance on the edge of the red signal. Consequently, if the red image is small, this low luminance signal becomes a greater portion of the total image size and causes the total red image to appear dark.

The enhancement unbalance between the red and green images as depicted in the waveforms of FIGS. 2A, 2B and 2C might be reduced by simply deriving a contour signal from the red video and summing this red contour signal with the green contour signal and then adding the resulting contour signal to each of the color video signals or to the luminance signal. However, this simple solution may well result in additional problems since the summation of red and green contour signals cause other problems particularly when the images are adjacent to each other. This is depicted in the waveforms of FIGS. 4A-4D. FIG. 4A is a waveform depicting approximately equal level red and green images in adjacent relationship. The green contour signals are illustrated in the waveform of FIG. 4B, and the red contour signals, derived from the red video signal, are depicted in FIG. 4C. When the red and green contour signals are added together and superimposed on the delayed luminance signal, the result is depicted by the waveform of FIG. 4D. Here it is seen that the red and green contour signals cancel each other out at the adjacent points of the equal level red and green images. This causes a loss or unbalance of enhancement at the color edges.

Reference is now made to the waveforms of FIG. 5A-5D. The waveform in FIG. 5A illustrates a slightly misregistered picture. In one instance, the green and red images are separated, and in a second instance the green and red images are overlapping. The green and red contour signals derived from the green and red video signals are illustrated in the waveforms of 5B and 5C, respectively. When the contour signals are added to the delayed luminance signal, the result is that as shown by the waveform of FIG. 5D. Here it is seen that the misregistration error is accentuated rather than being subdued, as would be the case with a single contour signal.

Figure 6:
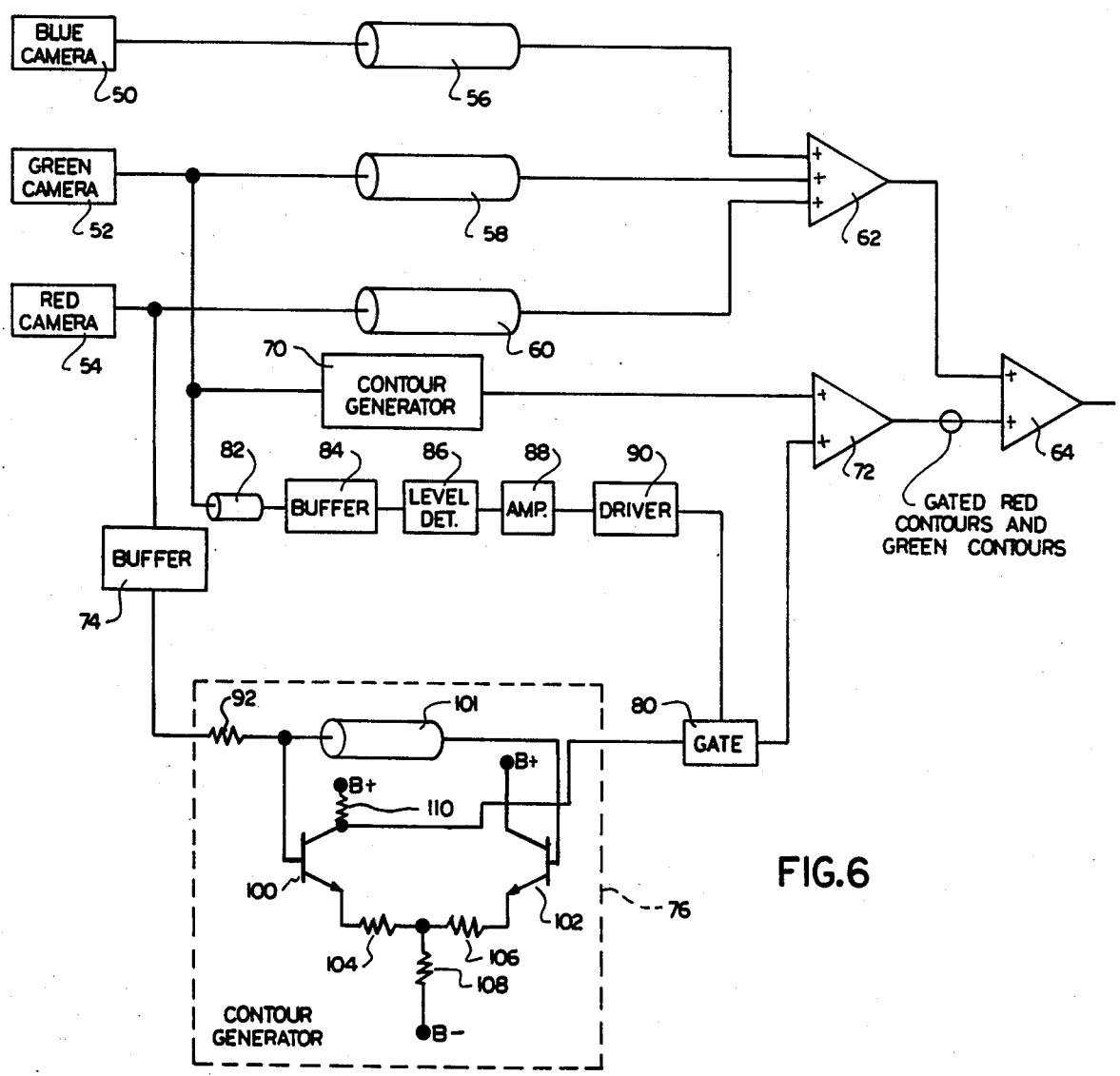
FIG. 6 is a schematic-block diagram illustration of the preferred embodiment of the present invention.

Reference is now made to FIG. 6 which illustrates the circuitry in accordance with the present invention. As will become apparent, the embodiment of the invention as illustrated in FIG. 6, like the prior art of FIG. 1, employs a contour generator for deriving a contour signal from the green video signal. Additionally, the circuitry provides a contour generator for deriving a second contour signal from the red video signal. This red derived second contour signal is selectively added to the green contour signal to provide a composite contour signal which is then added to the luminance signal in a manner known in the prior art.

The circuitry of FIG. 6, like that in FIG. 1, contemplates a television system employing blue, green and red camera tubes 50, 52 and 54 which respectively provide blue, green and red video signals. These signals are respectively delayed by delay lines 56, 58 and 60 before being summed together with a summing circuit 62 to provide a luminance signal. The luminance signal obtained from summing circuit 62 is supplied as one input to an additional summing circuit 64 wherein the luminance signal is summed with a contour signal derived in accordance with the present invention. The green contour generator 70 derives a contour signal from the green video and this is supplied to a summing circuit 72 to which there is selectively added a gated red contour signal.

The circuitry for providing the gated red contour signal is illustrated in the lower portion of FIG. 6. A red contour signal is derived from the red video signal by supplying the red video signal by way of a buffer 74 to a contour generator 76. This is constructed in the same fashion as contour generators 16 and 70 and serves to provide a red contour signal having a waveform such as that as illustrated in FIGS. 4C and 5C described hereinbefore.

The output from the contour generator is supplied as one input to a gate 80 which, for example, may conveniently include a field effect transistor. The gating signal selectively opens or closes gate 80 so as to either block or pass the red contour signal supplied by the contour generator 76. The gating signal is derived from the green video signal Thus, the green video signal is supplied to a delay line 82 which imposes a delay T and which delay is one-half of the delay 2T imposed by the contour generator 76. The delayed green video signal is then supplied by way of a buffer 84 to a level detector 86. Providing the green video signal level is above 10% of nominal level, then it is passed and amplified, as with an amplifier 88. This is supplied to a gate driver 90, which in turn applies the gating signal to the gate 80 to selectively pass or block the red contour signal.

Each of the contour generators disclosed herein may take the form of that of contour generator 76 in FIG. 6. Here, the output of buffer 74 is supplied through a resistor 92 directly to the base of an NPN transistor 100 and by way of delay line 101 to the base of a second NPN transistor 102. The emitters of transistors 100 and 102 connected by way of resistors 104 and 106 to a common junction and, thence, through a resistor 108 to a B-voltage supply source. The collector of transistor 100 is connected to a B+voltage supply source through a resistor 110, whereas the collector of transistor 102 is directly connected to a B+voltage supply source. The junction between this resistor and the collector of transistor 100 serves as the output to the gate 80. As is seen, for example, in FIGS. 7A and 7C, when the leading edge of the red video signal is positive, the output from the contour generator will go negative for a time transistion T and then go positive for a time transistion T. The total time transition, then, of the contour generator is 2T. The gating signal supplied to gate 80 is derived from the green video signal and is seen in the waveform of FIG. 7D the gating signal as delayed by one-half the total contour transition, i.e., it is delayed by a time T.

The operation of the circuitry of FIG. 6 will be best understood with reference to the following description given in conjunction with the waveforms of FIGS. 7 and 8. As will be noted, the waveforms in FIGS. 7A and 8A present the same conditions as discussed previously with respect to the waveforms of FIGS. 4A and 5A, respectively. Thus, the condition represented in the waveform of FIG. 7A illustrates the video signal when the green and red images are adjacent to each other. As in the case of the prior art, the green contour generator 70 provides a green contour signal as illustrated in the waveform of FIG. 7B. Additionally, the red contour signal, as illustrated in the waveform of FIG. 7C, is provided by the red contour generator 76. The red contour gating signal is derived from the green video signal and takes the form as illustrated in the waveform of FIG. 7D. When the red contour gating signal is supplied to the gate 80, it blocks the negative going transition of the red contour signal, leaving only the positive transition as is seen in the waveform of FIG. 7E. Consequently, the positive transition of the green contour signal is not cancelled out by this summation process and this positive transition provides balanced enhancement of the red-green edges without causing dark reds as is seen in the waveforms of FIGS. 7F and 7G. This contrasts with the resultant waveform in FIG. 4D where a green contour signal and an uncompensated red contour signal are combined and added to the luminance signal. It is seen, then, that the circuitry in accordance with the present invention provides balanced enhancement for the red-green edges when the red and green video are adjacent to each other.

A comparison of FIG. 3 and FIG. 7 shows the negative going transitions in the small red area are removed with the addition of red contours. This eliminates the "dirty red" appearance in scenes that often is observed with only contours from green.

Attention is now directed to the waveform of FIG. 8A, which like that of the waveform of FIG. 5A, illustrates a condition where the red and green video signals are slightly misregistered in the sense that they are separated in one case, and are overlapping in the other. The circuitry of FIG. 6 serves to provide green and red contour signals as is shown by the waveforms of FIGS. 8B and 8C, as well as the red contour gating signal, as indicated by the waveform of FIG. 8D. As seen in the waveform of FIG. 8E, the gating signal causes the gate 80 to block the red contour signal in the condition where the red and green video signals overlap, but passes the red contour signal, that is obtained from the leading edge of the red video signal, where it is spaced from the lagging edge of the adjacent, but separated, green video signal. When this gated red contour signal is added to the green contour signal, the result is indicated as by the waveform of FIG. 8F. When this gated red and green contour signal is added to the luminance signal, it will result in the waveform as is seen in FIG. 8G. By comparing the waveform of FIG. 8G with that of the waveform in FIG. 5B, it is seen that the circuitry of FIG. 6, eliminates the multiple transitions shown in the waveform of FIG. 5D for the condition of a misregistration intersection. Consequently, it is seen that the red contour signal is added to the green contour signal only when it will not result in accentuating the color registration errors.

Whereas the invention has been described in conjunction with a preferred embodiment, it is to be appreciated that various modifications may be made without departing from the spirit and scope of the invention as defined by the appended claims.

What is claimed is:

1. A contour correction system for a television system having means for providing at least first and second video color signals, said correction system comprising:
   means for deriving first and second contour signals from said first and second video color signals, respectively;
   means for always combining said first contour signal with said color signals to enhance picture sharpness at color transitions thereof;
   means for selectively combining said second contour signal with said color signals only when said first color signal is below a predetermined level, said selective combining means includes gating means controlled in dependence upon said first color signal for passing said second contour signal as a gated contour signal when said first color signal is below said predetermined level 2. A contour correction system as set forth in claim 1, including summing means for receiving and summing said first contour signal and said gated contour signal to provide a composite contour signal.

3. A contour correction system as set forth in claim 2 wherein said combining means is also responsive to said composite contour signal for combining it with said color signal.

4. A contour correction system as set forth in claim 1 including means for deriving a gating signal from said first color signal for controlling said gating means.

5. A contour correction system as set forth in claim 4 wherein said gating signal deriving means includes means for delaying said first color signal by a time delay T so that said gating signal is delayed relative to said first color signal by a time delay T.

6. A contour correction system as set forth in claim 5 wherein each said contour signal deriving means includes time delay means such that each contour signal has a time duration of 2 T.

7. A contour correction system as set forth in claim 6 wherein said gating means normally passes said second contour signal and blocks said second contour signal for a time duration corresponding with said gating signal, and means for applying said gating signal to said gating means for blocking said second contour signal.

8. A contour correction system as set forth in claim 7 wherein said signal applying means includes level detector means for applying said gating signal only when the first color signal exceeds a predetermined value.

* * * * *